United States Patent Office 3,523,947
Patented Aug. 11, 1970

3,523,947
1-CYCLIC AMIDINE-5-ARYL-1,4-BENZO-
DIAZEPINE AND PROCESS
Michael E. Derieg, West Orange, Rodney Ian Fryer,
North Caldwell, and Leo Henryk Sternbach, Upper
Montclair, N.J., assignors to Hoffmann-La Roche Inc.,
Nutley, N.J., a corporation of New Jersey
No Drawing. Filed Nov. 23, 1966, Ser. No. 596,399
Int. Cl. C07d 57/12, 57/04, 57/02
U.S. Cl. 260—256.4
9 Claims

ABSTRACT OF THE DISCLOSURE 5-aryl-1,4-benzodiazepines substituted in the 1-2 positions thereof with a cyclic nitrogen-containing group and process for preparing the foregoing. The said benzodiazepines are useful as anticonvulsants, muscle relaxants, psychostimulants and sedatives.

DETAILED DESCRIPTION OF THE INVENTION

The present invention relates to novel derivatives of 5-aryl-1,4-benzodiazepine-2-ones and processes for making the foregoing. More specifically, the present invention relates to 5-aryl-1,4-benzodiazepines substituted in the 1-2 positions thereof with a cyclic nitrogen-containing group and to processes for preparing the foregoing.

The said novel 1,2-heterocyclic substituted 5-aryl-1,4-benzodiazepine to which the present invention relates is selected from the group consisting of compounds of the formula

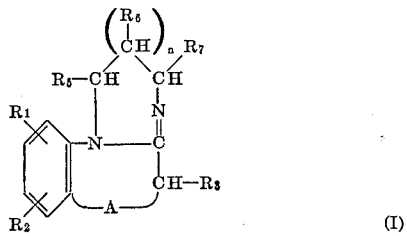

(I)

and acid addition salts thereof with pharmaceutically acceptable acids and quaternary salts thereof, wherein A is selected from the group consisting of

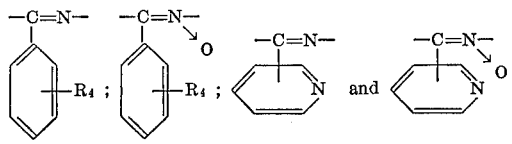

$n$ is an integer from 0–1; $R_1$ and $R_2$ are selected from the group consisting of halogen, hydrogen, trifluoromethyl, nitro, lower alkyl, amino and cyano; $R_3$, $R_5$, $R_6$ and $R_7$ are each selected from the group consisting of hydrogen and lower alkyl; and $R_4$ is selected from the group consisting of hydrogen and halogen.

The term "halogen" as used in this disclosure comprehends all four forms thereof, i.e., chlorine, fluorine, iodine and bromine, unless otherwise specified. The expression "lower alkyl" as used herein includes $C_1$–$C_6$ straight and branched chain hydrocarbon groups such as methyl, isobutyl, ethyl, propyl and the like.

In a preferred embodiment, $R_1$, $R_3$ and $R_5$, $R_6$ and $R_7$ are all hydrogen and $R_2$ is joined to the ring nucleus of the compound of the Formula I above, when $n$ is 0, in the 8-position thereof and when $n$ is 1, in the 9-position thereof. In a still more preferred embodiment, $R_2$ is advantageously selected from the group consisting of hydrogen, nitro, halogen, advantageously, chlorine and bromine and trifluoromethyl, most preferably, positioned on the ring nucleus as above. In a still more preferred embodiment, A is selected from the group consisting of

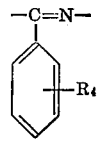

and

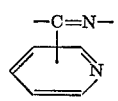

Preferably, when A in the Formula I above includes a phenyl group, $R_4$ is joined to the latter at the 2′-position thereof. When $R_4$ represents halogen, in an advantageous aspect, it is fluorine. Furthermore, when the grouping A includes a pyridyl group, such pyridyl group is preferentially joined to the ring nucleus at the 2-position of the pyridyl group. Thus, as is evident from the above, the most preferred group of compounds included within the genus encompassed by Formula I above are of the formula

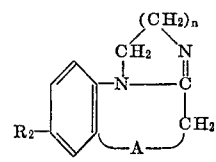

Ia wherein A is selected from the group consisting of

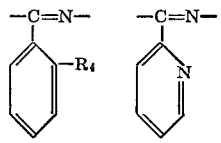

$n$ is 1 or 2, $R_2$ is nitro, hydrogen, trifluoromethyl, or halogen, advantageously, chlorine or bromine and $R_4$ is hydrogen or halogen, and when halogen, preferentially, fluorine.

In addition to the compounds of the Formulas I and Ia above, there are also encompassed within the scope of the present invention, the acid addition salts thereof with pharmaceutically acceptable acids. The compounds of the Formulas I and Ia form pharmaceutically acceptable acid addition salts with pharmaceutically acceptable inorganic and organic acids such as hydrohalic acids, e.g. hydrochloric acid and hydrobromic acid, sulphuric acid, phosphoric acid, nitric acid, tartaric acid, citric acid, camphorsulfonic acid, ethanesulfonic acid, ascorbic acid, salicylic acid, maleic acid and the like.

Compounds of the Formula I above also form quaternary ammonium salts with conventional quaternizing agents such as lower alkyl and lower alkenyl halides, e.g. methyl iodide and allyl bromide, and di-lower alkyl sulphates such as dimethyl sulphate.

Compounds of the Formula I above wherein A is the grouping

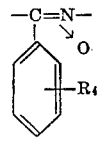

and

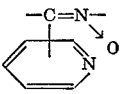

wherein R$_4$ is as above, are especially of interest as intermediates in the preparation of the corresponding compounds of the Formula I above wherein A is the grouping

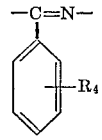

and

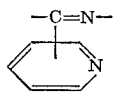

wherein R$_4$ is as above.

The latter compounds can be prepared by treatment of the former with a mild reducing agent such as, for example, a phosphorus trihalide, e.g. phosphorus trichloride at a temperature from about 75° to about 100° C. in a solvent medium which may the phosphorus trichloride per se or which may comprise an inert organic solvent such as chloroform. When phosphorus trichloride is provided in greatly excessive amounts, it can conveniently serve a two fold purpose, i.e. as a reducing agent and as a solvent.

Compounds of the Formula I above can be prepared by several preparative routes. In one of such routes, a 5-aryl-1,4-benzodiazepin-2-one bearing a halo-lower alkyl group in position-1, for example, a 2-haloethyl group or a 3-halopropyl group, i.e. a compound having the formula of

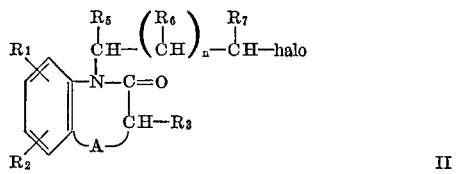

(halo is preferably, chlorine, bromine or iodine) wherein $n$, A, R$_1$, R$_2$, R$_3$ and R$_5$, R$_6$ and R$_7$ are as in Formula I above, is reacted with ammonia whereby to effect cyclization of the compound of the Formula II above to the corresponding compound of the Formula I above.

The above reaction can be conducted in liquid ammonia or an inert solvent medium formed from one or more inert organic solvents such as lower alkanols, e.g. methanol and ethanol, dimethylformamide, tetrahydrofuran, benzene, toluene or mixtures thereof and the like. Preferably, the solvent medium employed is a lower alkanol, most preferentially, ethanol, and it is provided to the reaction zone with the ammonia by utilizing alcoholic ammonia, preferentially, ethanolic ammonia. Temperature and pressure are not critical aspects of this process step and, thus, the reaction can be carried out at room temperature and atmospheric pressures or at elevated temperatures and/or elevated pressures or at reduced temperatures and/or reduced pressures. An especially advantageous temperature range is from about 25° to about 150°, most preferably from about 75° to about 100° C. In one especially preferred procedural variation, the reaction is carried out under pressure. A suitable temperature for this especially preferred procedural variation is from about 25° to about 150° C.

In one advantageous aspect of the present invention, the compounds of the Formula II above are added to a lower alcoholic ammonia solution, e.g. an ethanolic ammonia solution. The reaction medium is then agitated at room temperature. In an alternative more advantageous procedural variation, the reaction medium, resulting from the said addition, is heated under pressure. When effecting the reaction of a compound of the Formula II with ammonia in any procedural variation, it has been observed that the addition of a promoter such as an alkali metal iodide, e.g., potassium iodide or sodium iodide improves the yield of the desired end product, namely, a compound of the Formula I. Accordingly, in the most advantageous aspect of the present invention, to the reaction zone when effecting the conversion of a compound of the Formula II to the corresponding compound of the Formula I above, a promoter such as an alkali metal iodide compound e.g. potassium iodide, is added whereby the reaction proceeds in its presence.

Another advantageous approach for preparing compounds of the Formula I (and Ia) above involves utilizing as a starting material, the corresponding 5-aryl-1,4-benzodiazepin-2-one wherein the 1-position nitrogen atom is unsubstituted, i.e. bears a hydrogen atom attached thereto. This process aspect is particularly useful when compounds of the Formula I wherein $n$ is 0 are desired. For example, compounds corresponding to the formula

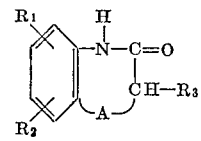  III wherein R$_1$, R$_2$, R$_3$ and A are as above, are reacted, preferably, after first effecting conversion of said 1-unsubstituted compounds into their so-called 1-sodio derivatives, with a compound of the formula

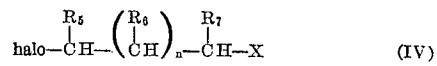     (IV)

wherein $n$, R$_5$, R$_6$ and R$_7$ have the same meanings as ascribed thereto hereinabove, the halo group is preferably selected from the group consisting of chlorine and bromine and X is selected from the group consisting of carbobenzoxyamino, phthalamido, succinamido, and lower alkanoyl amido, e.g., acetamido, whereby to prepare a compound of the formula

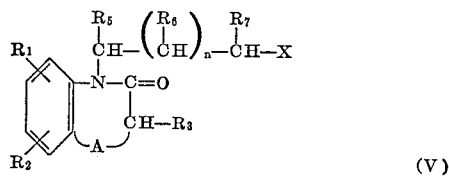

(V)

wherein A, X, $n$, R$_1$, R$_2$, R$_3$, R$_5$, R$_6$ and R$_7$ are as above in Formula I.

Compounds of the Formula V above are novel, are useful as intermediates in the preparation of compounds of the Formula I above and hence, constitute part of the present invention. The conversion of compounds of the Formula III above to the corresponding compounds of the Formula V above via the reaction of the former with a compound of the Formula IV above can be conducted in an inert organic solvent medium utilizing one or more inert organic solvents such as methanol, ethanol, dimethylformamide, tetrahydrofuran, benzene, toluene or the like. Temperature and pressure are not critical to this process step and the reaction can be carried out at room temperatures and atmospheric pressures and at elevated temperatures and/or elevated pressures or at reduced temperatures and/or reduced pressures. A preferred temperature range is from about 25° C. to about 50° C. Conventional reagents such as sodium methoxide, sodium hydride or the like can be employed to form the sodio derivative. The 1-sodio derivatives of the 1-unsubstituted compounds, i.e., those having hydrogen in the 1-position, are not part of this invention.

The compounds of the Formula V above are then solvolized whereby the corresponding compound of the formula

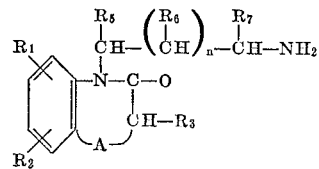

(VI)

wherein $R_1$, $R_2$, $R_3$, $R_5$, $R_6$, $R_7$, A and $n$ have the same meanings as ascribed thereto hereinabove in Formula I. Such solvolization is achieved utilizing any suitable solvolizing system capable of effecting this end. The solvolization can be effected in an acid medium, a neutral medium or an alkaline medium according to conventional procedures well documented in the literature, for example, those taught by the prior art which result in the removal of a carbobenzoxy group and the like. Preferred is a system which involves glacial acetic acid and a hydrogen halide, such as hydrogen bromide.

Compounds of the Formula VI above are novel compounds, are useful in view of their capability of being converted into compounds of the Formula I above and hence, constitute a part of the present invention.

Compounds of the Formula VI can be cyclized into the corresponding compounds of the Formula I by conventional dehydrating techniques. For example, compounds of the Formula VI above can be dissolved in any conveniently available inert organic solvent such as a lower alkanol, e.g. methanol, ethanol, and the like, ethers such as ethyl ether, dioxane or the like, or any other suitable solvent. The resultant solution is then heated, most preferably at about the reflux temperature of the reaction medium or at about 100° under pressure. By treating the compounds of the Formula VI above accordingly, there is obtained the corresponding compounds of the Formula I above.

Compounds of the Formula I above wherein $R_1$ is hydrogen and $R_2$ is nitro can be reduced by conventional techniques, e.g. hydrogenation in the presence of Raney nickel, to form the corresponding compound of the Formula I above wherein $R_2$ is amino. The resultant compound wherein $R_2$ is amino, if desired, can be selectively converted into the corresponding compound of the Formula I above wherein $R_2$ is halogen or cyano by the treatment thereof with nitrous acid in the presence of a mineral acid, e.g. hydrochloric acid, followed by treatment of the resultant substance with a strong hydrohalic acid, e.g. hydrochloric acid in the presence of a copper catalyst, e.g. cuprous halide such as cuprous chloride in the case where a compound of the Formula I above wherein $R_2$ is halogen is desired and cuprous cyanide in the case where a compound of the Formula I above wherein $R_2$ is cyano is desired. By treating a compound of the Formula I above wherein $R_1$ and $R_2$ are hydrogen with nitrous acid and sulfuric acid according to conventional procedures, there can be obtained the corresponding compound of the Formula I above wherein $R_2$ is nitro.

Compounds of the Formula I above and their pharmaceutically acceptable salts are useful as anticonvulsants, muscle relaxants, psychostimulants and sedatives. They can be administered internally, for example, parenterally or enterally, in conventional pharmaceutical dosage forms. For example, they can be incorporated into conventional liquid or solid vehicles to provide elixirs, suspensions, tablets, capsules, powders and the like according to acceptable pharmaceutical practice.

The following examples are illustrative but not limitative of the present invention. All temperatures are stated in degrees centigrade and all melting points are corrected.

EXAMPLE 1

A solution of 122 g. of 7 - chloro-1,3-dihydro-5-(2-fluorophenyl)-2H-1,4-benzodiazepin-2-one in 400 ml. of dry N,N-dimethylformamide was treated at about 15° with 17.2. g. of a 60% suspension of sodium hydride in mineral oil. The mixture was stirred for 15 min. and was then treated with 113 g. of the carbobenzoxy derivative of 2-bromoethylamine. [Katchalski and Ishai, J. Org. Chem. 15, 1067 (1950)]. The reaction mixture was stirred for 1.5 hr. at 20°, then at 48° for 15 min., and was then stirred overnight at room temperature. The resulting mixture was poured into 800 ml. of water. The so-formed aqueous medium was extracted with dichloromethane (3× 200 ml.). The organic layers were combined, washed, dried and evaporated to give 1-[2-(benzyloxycarbonylamino)ethyl]-7-chloro-1,3-dihydro - 5 - (2-fluorophenyl)-2H - 1,4 - benzodiazepin - 2 - one as an oil. The oil was shaken with hexane and the hexane was discarded. Next the oil was dissolved in a benzene/hexane mixture (1:1) and filtered over a pad of 200 g. silica. The benzene/hexane mixture was used until no more material was eluted from the column. The eluates were evaporated and the residual oil was crystallized from methanol to give 1-[2-(benzyloxycarbonylamino)ethyl] - 7 - chloro - 1,3 - dihydro - 5 - (2 - fluorophenyl) - 2H - 1,4 - benzodiazepin-2-one as white prisms, M.P. 142–145°.

EXAMPLE 2

A suspension of 50.7 g. of 1 - [2-benzyloxycarbonylamino)ethyl] - 7 - chloro - 1,3 - dihydro - 5 - (2-fluorophenyl) - 2H - 1,4 - benzodiazepin - 2 - one in 130 ml. of glacial acetic acid was treated with 130 ml. of a 31% (w./w.) solution of hydrogen bromide in glacial acetic acid. The resulting solution was stirred at room temperature for 1 hr. and then poured slowly and with stirring into 4 l. of ether. 1 - (2 - aminoethyl) - 7 - chloro - 1,3-dihydro - 5 - (2 - fluorophenyl) - 2H - 1,4-benzodiazepin-2 - one hydrobromide precipitate which was filtered and washed with ether and acetone (white prisms, M.P. 217–230° decomp.).

The base, 1 - (2 - aminoethyl) - 7 - chloro - 1,3-dihydro-5 - (2 - fluorophenyl) - 2H - 1,4 - benzodiazepin - 2 - one, was obtained by dissolving hydrobromide in 150 ml. of water, adding 150 ml. of dichloromethane and then enough ammonium hydroxide to bring the pH to 9.

The layers were separated and the aqueous layer was extracted with dichloromethane (2× 100 ml.). The organic layers were combined, washed, dried and evaporated to give the said base as an oil.

The base was next characterized as the hydrochloride by dissolving in ethanol and adding a slight excess of ethanolic hydrogen chloride. The solution was concentrated and cooled. 1-(2 - aminoethyl) - 7 - chloro - 1,3-dihydro - 5 - (2 - fluorophenyl) - 2H - 1,4-benzodiazepin-2 - one hydrochloride crystallized, was filtered and recrystallized from a methanol/ethanol mixture to give the pure material as white prisms, M.P. 221–223° (decomp.).

EXAMPLE 3

A solution of 5.0 g. (15 mmole) of 1-(2-aminoethyl)-7-chloro 1,3 - dihydro - 5 - (2 - fluorophenyl)-2H-1,4-benzodiazepin - 2 - one was refluxed over a period of 24 hr. in 100 ml. of ethanol (200 proof). The solvent was removed in vacuo leaving a crude gum which was heated with cyclohexane to give 8 - chloro - 6 - (2 - fluorophenly)-1,2 - dihydro - 4H - imidazo[1,2 - a][1,4]benzodiazepine of pale yellow crystals, M.P. 174–179°. Recrystallizations from methylene chloride cyclohexane gave the product as colorless needles, M.P. 175–177°.

EXAMPLE 4

A solution of 28.2 g. (0.1 mole) of 7-chloro-1,3-dihydro-5-phenyl - 2H - 1,4 - benzodiazepin - 2 - one in a mixture of tetrahydrofuran (500 ml.) and N,N-dimethylformamide (200 ml.) under dried nitrogen was stirred for 2 hr. in the presence of 4.5 g. (0.115 mole) of sodium amide at 50°. The semisolid mixture of sodium salt and solvents was allowed to cool to room temperature and 60 g. (0.3 mole) of 1,3-dibromopropane was added in one portion. The reaction mixture was then stirred overnight with no external heating. The sodium bromide was removed by filtration and the filtrate poured into water and extracted three times with methylene chloride, dried over anhydrous $MgSO_4$ and reduced in vacuo to a pale yellow gum. The crude product was chromatographed over a column of Alumina (Woelm, activity I, neutral). Petroleum ether was passed through the column. The eluent was evaporated giving 1 - (3 - bromopropyl)-7-chloro - 1,3 - dihydro - 5 - phenyl - 2H-1,4-benzodiazepin- 2-one, M.P. 82–90°. Recrystallization of the product from etherhexane gave colorless prisms, M.P. 89–93°.

A solution of 11.7 g. (0.03 mole) of 1-(3-bromopropyl) - 7 - chloro - 1,3-dihydro-5-phenyl-2H-1,4-benzodiazepin-2-one in 225 ml. of ethanol and 30 g. of ammonia was stirred at room temperature for 72 hrs. The solvent was removed in vacuo and the residue partitioned between methylene chloride and a 5% solution of sodium carbonate. The organic layer was washed with water, benzene was added and the solvent and water removed in vacuo leaving a gum. The gum was dissolved in benzene and refluxed overnight, and the solution was treated with hexane to cloudiness. Upon standing, a pale yellow gum separated. Solution in 25 ml. of ether and treatment with 50 ml. of hexane gave a gum and a clear mother liquor which were separated. Upon standing, the last-mentioned mother liquor gave crystalline 9-chloro-7-phenyl-1,2,3,5-tetrahydropyrimido[1,2 - a] [1,4] benzodiazepine, M.P. 155–157°. Recrystallizations from cyclohexane-hexane gave the same M.P.

EXAMPLE 5

A mixture of 45 g. (0.13 mole) of 7-chloro-1-(3-chloropropyl) - 1,3 - dihydro - 5-phenyl-2H-1,4-benzodiazepin-2-one, 21.6 g. (0.13 mole) of potassium iodide and an excess of ammonia in 250 ml. of ethanol was heated at 75° for 10 hrs. with shaping in a sealed container. The reaction mixture was filtered to remove potassium iodide and the filtrate reduced in vacuo to a residue which was crystallized from ethanol to give colorless crystalline needles of 9-chloro-7-phenyl-1,2,3,5-tetrahydropyrimido [1,2-a][1,4] benzodiazepine (hydro iodide), M.P. 270–275°. The melting point was unchanged on recrystallization from ethanol.

EXAMPLE 6

A solution of 10.0 g. (0.035 mole) of 7-chloro-5-(2-fluorophenyl)-3H-1,4-benzodiazepin-2(1H -one in 200 ml. of dried tetrahydrofuran and 75 ml. of distilled dimethylformamide under nitrogen was treated with 2.0 g. (0.05 mole) of sodium amide. The reaction mixture was stirred for 2.5 hrs. at 50°, cooled to 10° and treated in batch with 40.4 g. (0.2 mole) of 1,3-dibromopropane. This mixture was then heated to 50° and stirred for 2 hrs., filtered through a pad of alumina and poured into an excess of water. Extraction with methylene chloride, removal of the solvent and the water and crystallization from etherhexane gave 1 - (3 - bromopropyl) - 7-chloro-5(2-fluorophenyl) - 1,3 - dihydro-2H-1,4-benzodiazepin-2-one, M.P. 92–95°. Recrystallizations from ether gave colorless needles, M.P. 95–98°.

A solution of 6.7 g. (0.016 mole) of 1-(3-bromopropyl - 7 - chloro - 5(2-fluorophenyl)-1,3-dyhydro-2H-1,4-benzodiazepin-2-one in 200 ml. of ethanol with 15 g. of ammonia was allowed to stand at room temperature for 5 days. The solvent was removed leaving a solid which was partitioned between 5% sodium carbonate and methylene chloride. The organic layer was dried and reduced in vacuo to a yellow glass, which was dissolved in ether and treated with hexane to cloudiness. Standing gave a multicomponent gum which was separated from the clear mother liquor. Prolonged standing of the mother liquor gave 9 - chloro - 7 - (2-fluorophenyl)-1,2,3,5-tetrahydropyrimido[1,2 - a][1,4]benzodiazepine, M.P. 160–161°. Further standing gave more of the product, M.P. 150–159°.

Recrystallizations of the combined product from benzene-cyclohexane gave colorless prisms, M.P. 161.5–163°.

EXAMPLE 7

A solution of 50.0 g. (0.137 mole) of 7-chloro-1-(3-chloropropyl) - 5 - (2 - fluorophenyl) - 1,3-dihydro-2H-1,4-benzodiazepin-2-one in 300 ml. of ethanol and an excess of ammonia (41 g.) was heated with shaping at 75° for 10 hrs. in the presence of 44.8 g. (0.27 mole) of potassium iodide in a sealed container under tank pressure of ammonia. The reaction mixture was filtered to remove potassium iodide. The volume of the filtrate was reduced in vacuo to one-half and additional potassium iodide present was removed by filtration. Upon chilling of the last-mentioned filtrate, brown crystalline, monohydroiodide of 9-chloro-7-(2-fluorophenyl)-1,2,3,5-tetrahydropyrimido[1,2-a][1,4]-benzodiazepin, M.P. 234–235° was removed by filtration. An analytical sample of colorless plates from ethanol-ether melted at 286–289°.

Neutralization of the last-mentioned crystalline monohydroiodide gave the free base 9-chloro-7-(2-fluorophenyl) - 1,2,3,5 - tetrahydropyrimido[1,2-a][1,4]benzodiazepine which was dissolved in 100 ml. of isopropanol and to which was added 1.1 equivalent of hydrogen chloride in ethanol. The addition of ether gave gray crystalline mono hydrochloride of 9-chloro-7-(2-fluorophenyl) - 1,2,3,5 - tetrahydropyrimido[1,2-a][1,4]benzodiazepine, M.P. 279–280°. Recrystallizations from isopropanol-ether gave off-white prisms, M.P. 275–279° (d).

EXAMPLE 8

A solution of 19.5 g. (62 mmole) of 1.3-dihydro-5-phenyl-7-trifluoromethyl-2-H-1,4-benzodiazepin-2 - one in 100 ml. of N,N-dimethylformamide and 130 ml. of tetrahydrofuran under nitrogen was treated with 3.12 g. (30 mmole) of sodium amide at 50–60° for 1 hr. The reaction mixture was cooled to room temperature and treated in batch with 39.4 g. (0.25 mole) of 1-bromo-3-chloropropane. The reaction mixture was stirred overnight at room temperature and then poured into an excess of water. The aqueous mixture was extracted with methylene chloride and the extract washed with water. Removal of the solvent in vacuo gave a crystalline mass. The residue was dissolved in ether and eluted from an alumina column with hexane giving colorless crystalline 1 - (3 - chloropropyl) - 7 - trifluoromethyl-5-phenyl-1,3-dihydro-2H-1,4-benzodiazepin-2-one, M.P. 118–123°. Recrystallizations from ether-hexane gave colorless prisms, M.P. 120–121°.

A mixture of 12.0 g. (31 mmole) of 1-(3-chloropropyl)-7 - trifluoromethyl - 5 - phenyl - 1,3-dihydro - 2H - benzodiazepin-2-one, 5.1 g. (31 mmole) of potassium iodide and an excess of ammonia in 175 ml. of ethanol was sealed under 50 p.s.i. of ammonia and agitated at 80–90° for 10 hrs. The reaction solution was filtered from the unreacted potassium iodide and the filtrate reduced in vacuo to a residue which was redissolved in ethanol and treated with ether to give after chilling 7-phenyl-9-trifluoromethyl - 1,2,3,5 - tetrahydro pyrimido[1,2-a][1,4] benzodiazepine hydroiodide as a crystalline material, M.P. 263–282°. Recrystallizations from ethanol gave the product as colorless needles, M.P. 278–282° Neutralization of the hydroiodide gave the free base which when recrystallized from cyclohexane gave tan needles, M.P. 179–181°.

EXAMPLE 9

A solution of 30.0 g. (0.127 mole) of 1,3-dihydro-5-phenyl-2H-1,4-benzodiazepin-2-one in 275 ml. of tetrahydrofuran and 225 ml. of N,N-dimethylformamide was added to 5.85 g. (0.15 mole) of sodium amide. The reaction mixture was heated at 52° for one hour. The sodium salt so prepared was then treated with 78.7 g. (0.5 mole) of 1-bromo-3-chloropropane added in one batch. The reaction mixture was stirred overnight at 75°. It was then partitioned between methylene chloride and water and the organic phase was chromatographed over alumina, eluent hexane, to give a one component (TLC) liquid, 1-(3-chloropropyl)-1,3-dihydro-5-phenyl - 2H - 1,4-benzodiazepin-2-one.

A mixture of 15.0 g. (48 mmole) of the last-mentioned liquid, 8.3 g. (50 mmole) of potassium iodide and an excess of ammonia in 200 ml. of ethanol was heated with agitation in a sealed bomb at 75° for 10 hr. The reaction mixture was filtered to remove unreacted potassium iodide and the filtrate reduced in vacuo to 100 ml. The adidtion of ether resulted in the precipitation of the mono hydroiodide salt of 7-phenyl-1,2,3,5-tetrahydropyrimido[1,2-a][1,4]-benzodiazepine, M.P. 289–295°. Recrystallizations from ethanol gave colorless rods, M.P. 293–295°. Neutralization of the monohydroiodide gave the free base which was recrystallized from ether as tan prisms, M.P. 143–145°.

EXAMPLE 10

A mixture of 25.0 g. (79 mmole) of 7-bromo-1,3-dihydro-5-(2-pyridyl)-2H-1,4-benzodiazepin-2-one and 3.9 g. (100 mmole) of sodium amide in 150 ml. of dimethylformamide and 200 ml. of tetrahydrofuran was stirred at 50° for 2 hr. Upon cooling, 47.1 g. (300 mmole) of 1-bromo-3-chloropropane was added and the reaction mixture stirred overnight at room temperature. The reaction mixture was stirred into ice water and extracted with methylene chloride which was dried and reduced in vacuo to a residue. Chromatography of a benzene solution of the residue with hexane as the eluent gave upon removal of the solvent, crystalline 1-(3-chloropropyl)-7-bromo-1,3-dihydro-5-(2-pyridyl)-2H-1,4-benzodiazepin-2-one which upon crystallization from ether-hexane gave colorless prisms, M.P. 103–6°.

A mixture of 5.2 g. (13.2 mmole) of 1-(3-chloropropyl)-7-bromo-5-(2-pyridyl)-1,3-dihydro-2H-1,4-benzodiazepin-2-one, 2.2 g. (13.2 mmole) of potassium iodide and 30 ml. of ethanol with an excess of ammonia was heated at 75° for 10 hr. with shaking. Unreacted potassium iodide was removed by filtration and the filtrate diluted with a small amount of ether giving upon standing crystalline 9-bromo-7-(2-pyridyl)-1,2,3,5-tetrahydropyrimido[1,2-a][1,4]benzodiazepine hydroiodide, M.P. 269–272°. Recrystallizations from ethanol gave tan microprisms of the salt, M.P. 272–275°. Neutralization of the hydroiodide gave the free base which was recrystallized from cyclohexane as pale yellow prisms, M.P. 178–181°.

EXAMPLE 11

A tablet dosage form containing the following ingredients:

| | Per tablet, mg. |
|---|---|
| 9 - chloro - 7 - (2 - fluorophenyl) - 1,2,3,5 - tetrahydro-pyrmido[1,2-a][1,4]benzodiazepine | 5.00 |
| Dicalcium phosphate dihydrate, Unmilled | 195.00 |
| Corn starch | 24.00 |
| Magnesium stearate | 1.00 |
| Total weight | 225.00 | were prepared as follows:
The 9-chloro-7-(2-fluorophenyl)-1,2,3,5-tetrahydro-pyrimido-[1,2-a][1,4]benzodiazepine and the corn starch were mixed together and passed through a #00 screen in Model "J" Fitz with hammers forward. This premix was then mixed with the dicalcium phosphate and one-half of the magnesium stearate. The blend was then passed through a #1A screen in Model "J" Fitz with knives forward and slugged. The slugs were passed through a #2A plate in a Model "D" Fitz at slow speed with knives forward, and the remaining magnesium stearate was added. The resultant mixture was mixed and compressed.

EXAMPLE 12

A capsule dosage formulation containing the following ingredients:

| | Per capsule, mg. |
|---|---|
| 9 - chloro - 7 - (2 - fluorophenyl) - 1,2,3,5-tetrahydro-pyrimido-[1,2-a][1,4]benzodiazepine | 10 |
| Lactose, U.S.P. | 165 |
| Corn starch, U.S.P. | 30 |
| Talc, U.S.P. | 5 |
| Total weight | 210 | were prepared as follows:

The 9-chloro-7-(2-fluorophenyl)-1,2,3,5-tetrahydro-pyrimido[1,2-a][1,4]benzodiazepine, the lactose and the corn starch were mixed together in a suitable mixer. The so-prepared mixture was further blended by passing it through a Fitzpatrick Comminuting Machine with a #1A screen with knives forward. The blended powder was returned to the mixer. The talc was then added and blended thoroughly. The resultant mixture was filled into #4 hard shell gelatin capsules on a Parke Davis capsulating machine.

EXAMPLE 13

A parenteral dosage formulation containing the following ingredients:

| | Per cc. |
|---|---|
| 9 - chloro - 7 - (2 - fluorophenyl) - 1,2,3,5 - tetrahydro - pyrimido[1,2-a][1,4]benzodiazepine mg | 0.5 |
| Propylene glycol cc | 0.4 |
| Benzyl alcohol (benzaldehyde free) cc | 0.015 |
| Ethanol 95% U.S.P. cc | 0.10 |
| Sodium benzoate mg | 48.8 |
| Water for Injection q.s. cc | 1.0 |
| Benzoic acid mg | 1.2 | were prepared as follows (for 10,000 cc.):

5 gms. of 9-chloro-7-(2-fluorophenyl)-1,2,3,5-tetrahydropyrimido[1,2-a][1,4]benzodiazepine were dissolved in 150 cc. of benzyl alcohol. 4,000 cc. of propylene glycol and 1,000 cc. of ethanol were then added. After dissolving 12 gm. of benzoic acid in the prepared medium, 488 gm. of sodium benzoate dissolved in 3,000 cc. of Water for Injection was added. The solution was brought up to final volume of 10,000 cc. with Water for Injection. The solution was filtered thru an 02 Selas candle, filled into suitable size ampuls, gassed with $N_2$ and sealed. It was then autoclaved at 10 p.s.i. for 30 minutes.

We claim:
1. A compound selected from the group consisting of compounds of the formula

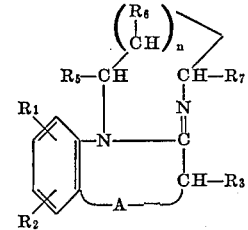

acid addition salts thereof with pharmaceutically acceptable acids; and quaternary salts thereof with lower alkyl halides, lower alkenyl halides or di-lower alkyl sulphates; wherein A is selected from the group consisting of

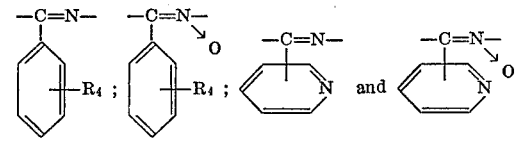

and

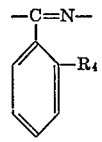

$n$ is the integer 0 or 1; $R_1$ and $R_2$ are selected from the group consisting of halogen, hydrogen, trifluoromethyl, nitro, lower alkyl having up to 4 carbon atoms, amino and cyano; $R_3$, $R_5$, $R_6$ and $R_7$ are each selected from the group consisting of hydrogen and lower alkyl having up to four carbon atoms; and $R_4$ is selected from the group consisting of hydrogen and halogen.

2. A compound as defined in claim 1 wherein A is selected from the group consisting of

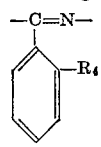

and

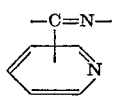

$R_1$, $R_3$, $R_5$, $R_6$ and $R_7$ are all hydrogen; $R_2$ is selected from the group consisting of nitro, hydrogen, trifluoromethyl and halogen and is positioned on the ring nucleus para to the nitrogen atom joined to the fused benzo ring; and $R_4$ is selected from the group consisting of hydrogen and halogen, i.e., a compound of the formula

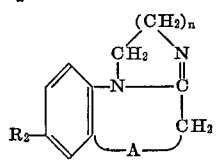

wherein A is selected from the group consisting of

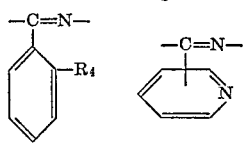

$n$ is an integer from 1–2; $R_2$ is selected from the group consisting of hydrogen, halogen, nitro and trifluoromethyl, and $R_4$ is selected from the group consisting of hydrogen and halogen.

3. A compound as defined in claim 2 wherein A is the group

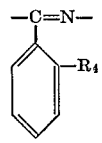

$R_2$ and $R_4$ are both halogen and $n$ is 2, i.e., a compound of the formula, 9-halo-7-(2-halophenyl)-1,2,3,5-tetrahydropyrimido[1,2-a][1,4]benzodiazepine.

4. A compound as defined in claim 3 wherein the 9-halo group is chlorine and the halo group on the 2-phenyl ring is fluorine, i.e. a compound of the formula 9-chloro-7-(2-fluorophenyl)-1,2,3,5-tetrahydropyrimido[1,2-a][1,4]benzodiazepine.

5. The compound as defined in claim 2 wherein A is

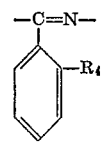

$R_2$ and $R_4$ are both halo and $n$ is 1, i.e., a compound of the formula 8-halo-6-(2-halophenyl)-1,2-dihydro-4H-imidazo[1,2-a][1,4]benzodiazepine.

6. A compound as defined in claim 5 wherein the 8-halo group is chlorine; and fluorine is in the 2-position of the 6-phenyl group, i.e., a compound of the formula 8-chloro-6-(2-fluorophenyl)-1,2-dihydro-4H-imidazo[1,2-a][1,4]benzodiazepine.

7. A compound as defined in claim 2 wherein A is a 2-pyridyl group, $n$ is the integer 2; $R_2$ is halogen, i.e., a compound of the formula 9-halo-7-(2-pyridyl)-1,2,3,5-tetrahydro-pyrimidinol[1,2-a][1,4]benzodiazepine.

8. A compound as defined in claim 7 wherein the halo group in position-9 is a 9-bromo group, i.e., a compound of the formula 9-bromo-7-(2-pyridyl)-1,2,3,5-tetrahydropyrimido[1,2-a][1,4]benzodiazepine.

9. A compound as defined in claim 2 wherein A is

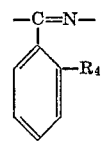

$R_2$ is trifluoromethyl; $R_4$ is selected from the group consisting of hydrogen and halogen and $n$ is 2, i.e., a compound of the formula 9-trifluoromethyl-7-($R_4$-phenyl)-1,2,3,5-tetrahydropyrimido[1,2-a][1,4]benzodiazepine wherein $R_4$ is selected from the group consisting of hydrogen and halogen.

References Cited
UNITED STATES PATENTS

| | | | |
|---|---|---|---|
| 3,329,679 | 7/1967 | Sulkowski et al. | 260—256.4 |
| 3,351,629 | 11/1967 | Griot | 260—309.6 |

ALEX MAZEL, Primary Examiner

R. J. GALLAGHER, Assistant Examiner

U.S. Cl. X.R.

260—256.5, 296, 309.6, 294.8, 239.3, 295; 424—251, 263, 273, 200, 232

PO-1050
(5/69)

UNITED STATES PATENT OFFICE
CERTIFICATE OF CORRECTION

Patent No. 3,523,947                Dated August 11, 1970

Inventor(s) Derieg, Fryer and Sternbach

It is certified that error appears in the above-identified patent and that said Letters Patent are hereby corrected as shown below:

Column 10   line 43   claim 1

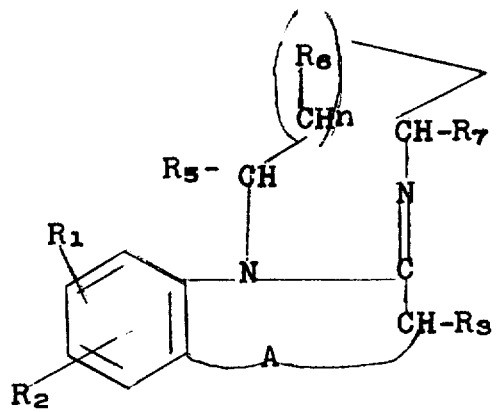

should be

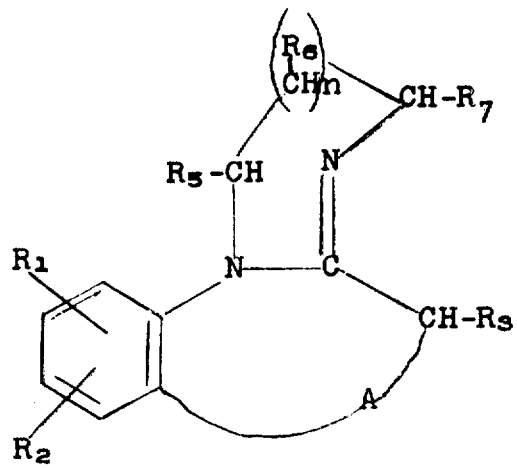

PO-1050
(5/69)

UNITED STATES PATENT OFFICE
CERTIFICATE OF CORRECTION

Patent No. 3,523,947                     Dated _____

Inventor(s) _____

It is certified that error appears in the above-identified patent and that said Letters Patent are hereby corrected as shown below:

Column 10     line 65 delete

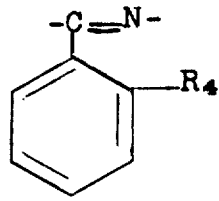

Signed and sealed this 8th day of June 1971.

(SEAL)
Attest:

EDWARD M. FLETCHER, JR.                    WILLIAM E. SCHUYLER, JR.
Attesting Officer                          Commissioner of Patents